United States Patent Office 3,296,953
Patented Jan. 10, 1967

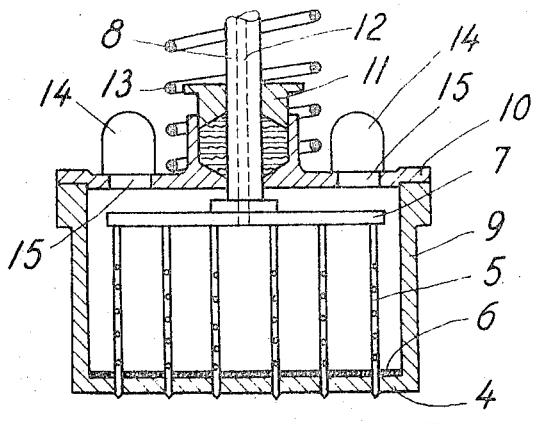
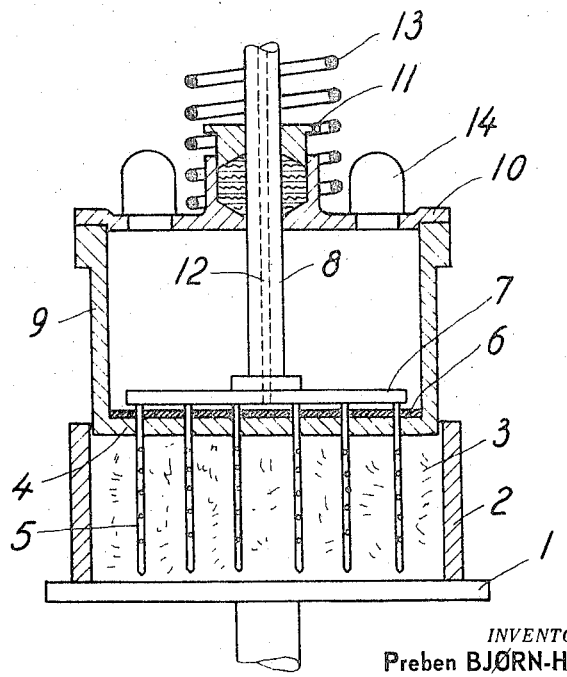

3,296,953
APPARATUS FOR INJECTING BRINE INTO MEAT PRODUCTS
Preben Bjørn-Henriksen, Sorup pr. Fredensborg, Fredensborg, Denmark, and Poul Christian Hansen, Roskildevej 149A, Tastrup, Denmark
Filed Sept. 24, 1964, Ser. No. 399,041
2 Claims. (Cl. 99—256)

This invention relates to an apparatus for injecting brine into meat products. For pickling meat products it is known to introduce brine manually into the meat by means of a hypodermic needle. To ensure introduction of the necessary amount of brine, for instance in a ham, several injections have to be made.

The efficiency of the said method of injection depends to a large extent upon the skill of the operator and the method is apt to involve a heavy loss of brine and unreliable pickling.

Attempts have been made to relieve this drawback by means of an apparatus in which a plurality of hypodermic needles are introduced into the meat simultaneously by mechanical means. The known apparatus of this design suffer, however, from the drawback that the apparatus does not always conform to the varying thickness of the pieces of meat.

While the brine is being injected all the openings provided in the needles will therefore not all of them be in a position inside the meat or at the same depth of the meat from time to time, and during part of the injection operation some of the said openings will be outside the meat. As a result a large amount of brine will be discharged outside the meat and involve an unreasonable loss of brine. Furthermore, in such an injection in which not all of the needle openings are covered by meat the desired pressure of injection can not be kept constant and this, again, will involve that the amount of brine injected will vary from operation to operation in accordance with the pressure variations, thus giving a varying brine percentage and consequently unreliable and inhomogenous pickling from ham to ham.

The present invention is concerned with an apparatus in which the said drawback of the varying brine percentage and the heavy waste of brine are eliminated.

An essential feature of the invention consists in an apparatus for injecting brine into meat products comprising a vertically movable table, an open topped meat receiving container adapted to be placed on the table, a liquid-tight box mounted above said table and having an outside dimension slightly smaller than the inside dimension of said container so that the box may be telescoped into the container, a lower wall of said box functioning as a pressure plate to compress the meat product in said container, said box being resiliently urged toward said table, a fixedly mounted hollow rod extending into the interior of said box through the top thereof and having a series of hollow, perforated needles attached thereto so as to provide a path for brine through the hollow rod and through the needles, a series of openings in said lower wall through which said needles extend, the ends of the needles being imperforate and normally extending in a liquid-tight relationship through said openings so as to prevent the escape of any brine out of the box, whereby when the container on said table is raised toward said box the box will be pushed upwardly and the needles will penetrate the meat product and form a brine flow path into the meat.

An embodiment of an apparatus according to the invention is illustrated schematically in the drawing, in which:

FIG. 1 shows the apparatus in a position immediately before a piece of meat is forced against the pressure plate, and FIG. 2 shows the same after compression of a piece of meat with the needles forced into it.

In the drawing, 1 shows a table on which may be placed a box 2 which is open both at its upper and its lower end, another embodiment being also conceivable, however. On the table inside the box is placed a piece of meat 3 to be injected with brine. If desired, the meat may already be placed in the tin for ultimate hermetical sealing, the lid being in that case only mounted later.

The apparatus is started by means of a two-hand starting device (not shown), and the table is raised by pneumatical, hydraulical or mechanical means whereby the upper side of the meat will be brought into contact with an overlying, perforated resilient pressure plate 4.

Through each of the holes that constitute the perforation of the plate is passed a hypodermic needle 5, liquid tight passage being ensured by means of a packing 6 behind the perforation. The needles 5, which are non-displaceable on a needle plate 7 provided on a central bar 8, will during the further movement of the table penetrate the meat until reaching the end portion indicated in FIG. 2, the movement of the table 1 only ceasing directly before it is brought into contact with the needle points. In this position a switch (not shown) will be activated and cause the brine to be discharged through the needles at a suitable pressure. In this embodiment the needles are provided with very small holes or slits uniformly distributed along the whole injection length of the needles.

The pressure plate 4 constitutes the bottom of a closed brine box 9 and fits closely as a piston in the box 2 which is open at its top. The bar 8 is passed liquid-tightly through a lid 10 and a stuffing box 11 provided on the box 9. The bar 8 is hollow and its cavity may form a passageway 12 for the brine to be fed to the needles 5.

A helical spring 13 serves furthermore to produce the pressure required for levelling the meat surface 3 that faces the pressure plate 4, the pressure to be transmitted from the meat to the pressure plate 4 in order to overcome the spring pressure being sufficient to level the meat surface before the said spring pressure is overcome.

The helical spring 13 may, for example, be substituted by a weight, pneumatic or hydraulic devices.

Since there is no supply of brine to the meat until the needle openings outside the pressure plate 4 are covered by the meat and since the said plate is kept firmly pressed against the meat by the helical spring 13 surrounding the bar 8 or in other manner, the part of the needles that is above the said plate being liquid-tightly enclosed, brine can only be discharged from such part of the needles as is inside the meat so that any waste of brine is eliminated.

With the use of an apparatus as that described, in which the injection needles during part of the operation are withdrawn and surrounded by a brine box, it is furthermore possible to carry out effective disinfection of the brine contained in the said box, the stuffing box 11 for the bar 8 being mounted centrally on the brine box 9. It will thereby be possible to design the cover around the said stuffing box so as to provide room here for mounting sterilising radiation sources 14 of known kind so that the contents of the brine box 9 may be subjected to the action of rays through the windows 15.

We claim:

1. An apparatus for injecting brine into meat products comprising a vertically movable table, an open topped meat receiving container adapted to be placed on the table, a liquid-tight box mounted above said table and having an outside dimension slightly smaller than the inside dimension of said container so that the box may be telescoped into the container, a lower wall of said box functioning as a pressure plate to compress the meat product in said container, said box being resiliently urged toward said table, a fixedly mounted hollow rod extending into the interior of said box through the top thereof and having a series of hollow, perforated needles attached thereto so as to provide a path for brine through the hollow rod and through the needles, a series of openings in said lower wall through which said needles extend, the ends of the needles being imperforate and normally extending in a liquid-tight relationship through said openings so as to prevent the escape of any brine out of the box, whereby when the container on said table is raised toward said box the box will be pushed upwardly and the needles will penetrate the meat product and form a brine flow path into the meat.

2. An apparatus as defined in claim 1, wherein said box is urged toward said table by means of a spring.

References Cited by the Examiner

UNITED STATES PATENTS

| | | |
|---|---|---|
| 1,987,349 | 1/1935 | Rasmussen. |
| 2,466,772 | 4/1949 | Kenyon _____ 99—257 |
| 2,560,060 | 7/1951 | Zwosta _____ 99—256 |
| 2,587,024 | 2/1952 | Avery _____ 99—257 |
| 2,628,552 | 2/1953 | Jones et al. _____ 99—257 |
| 2,688,151 | 9/1954 | Komarik et al. _____ 17—25 |

FOREIGN PATENTS

| | | |
|---|---|---|
| 502,486 | 7/1930 | Germany. |
| 801,864 | 9/1958 | Great Britain. |

BILLY J. WILHITE, *Primary Examiner.*